Sept. 1, 1942. W. A. PETERSEN 2,294,569
PIE SLICE LIFTER
Filed Nov. 17, 1941

W. A. Petersen
INVENTOR.

BY C. A. Knowles.

Patented Sept. 1, 1942

2,294,569

UNITED STATES PATENT OFFICE 2,294,569

PIE SLICE LIFTER

William A. Petersen, Excelsior Springs, Mo.

Application November 17, 1941, Serial No. 419,478

2 Claims. (Cl. 294—7)

This invention relates to kitchen and table articles, and more particularly to a device designed for lifting and removing slices of pies from the pans in which they are cooked.

The primary object of the invention is to provide a lifter of this character which may be used in lifting slices of pies having soft crusts, such as berry pies or custard pies, without danger of breaking the pie slices. Another object of the invention is to provide a lifter embodying a blade and handle, the handle being connected to the side of the blade in such a way that the weight of the pie slice held thereon, will be completely balanced, thereby reducing the possibilities of the pie slice sliding from the blade, while it is being transferred from the pie pan to a serving plate.

Referring to the drawing.

Figure 1:
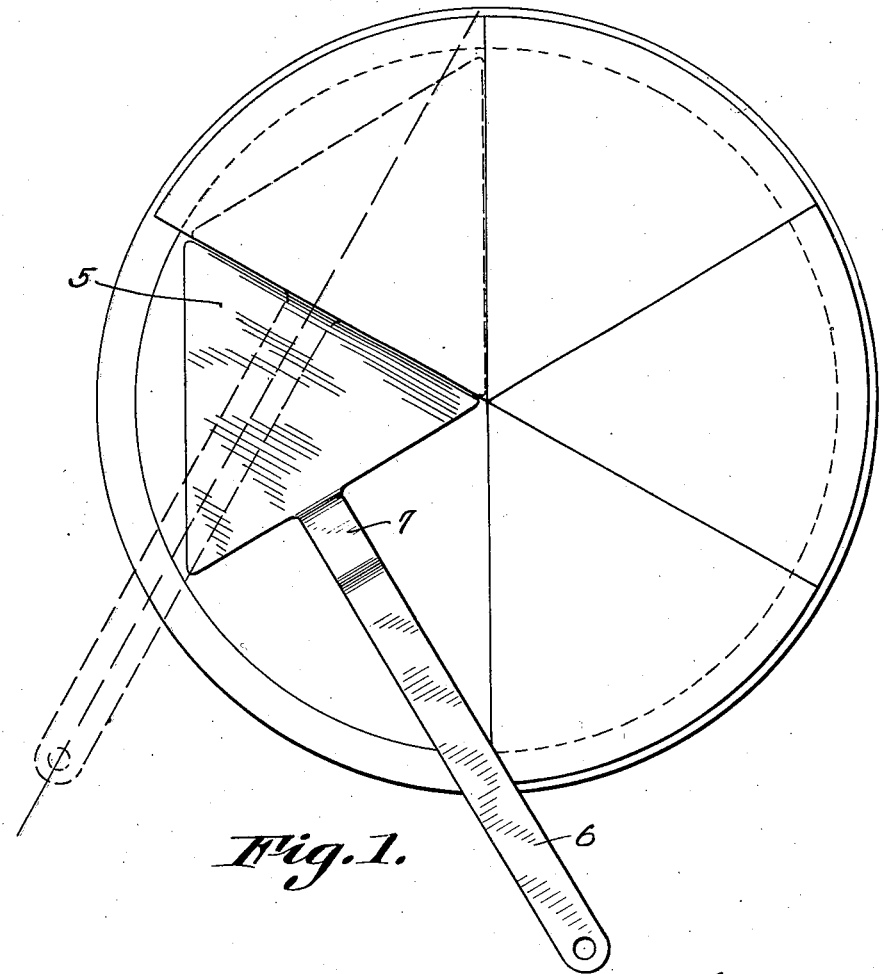
Figure 1 is a plan view illustrating the pie slice lifter constructed in accordance with the invention, as positioned preparatory to forcing the blade of the lifter under a slice to be removed.
Figure 2:
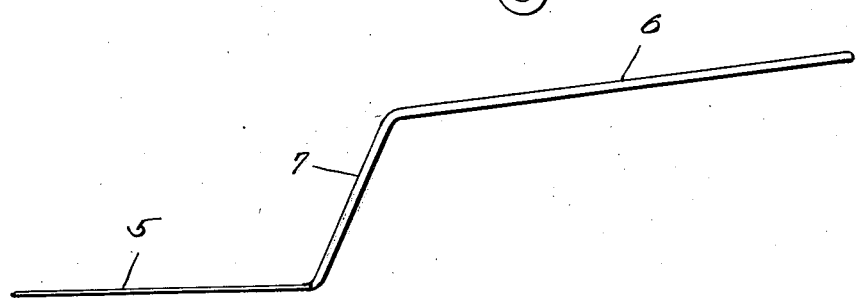
Figure 2 is a side elevational view of the lifter.

Referring to the drawing in detail the pie slice lifter embodies a substantially triangular blade 5, and a handle section 6, the handle section 6 being connected to the blade 5 along one of the straight edges of the blade, the point of connection between the blade and handle being slightly offset with respect to a line drawn centrally through the edge of the blade, or nearer to one corner of the blade than the adjacent corner, so that the blade, under normal conditions, is slightly off balance, for purposes to be hereinafter more fully described.

The portion of the handle indicated at 7, and which connects with the blade 5, extends downwardly for a distance, which is substantially twice the thickness of the pie, so that in using the slice lifter the hand of the user will not touch the pie. The handle 6 also slopes slightly upwardly, so that the hand of the person operating the blade, will not contact the surface of the pie, in removing a slice.

In using the device, the blade is used for removing the first slice of the pie, by merely inserting the blade under one edge of the pie slice. After a slice has been removed, the blade is positioned in a manner as shown by Figure 1 of the drawing, the blade occupying the space where the removed slice had been located.

The handle is now slightly twisted and the blade is forced under the next slice to be removed, the blade taking the position as shown in dotted lines in Figure 1 of the drawing. In view of the fact that a greater portion of the slice being removed will be resting on the narrow portion of the blade, or that portion of the device nearest to the side of the blade from which the handle extends, it will be seen that the larger portion of the blade will offset the weight of the pie slice, to the end that the slice of pie will be held in perfect balance while it is being transferred from the pie pan to the serving plate.

It might be further stated that while the lifter may be used for removing the slices of pies of the sliced apple or peach type, the lifter has been effectively used in removing slices of berry and custard pies having soft crusts, without breaking the soft crusts of the slices.

Having thus described the invention, what is claimed is:

1. A pie slice lifter, comprising a substantially triangular blade, a handle connected to one of the straight edges of the blade at a point offset with respect to a line drawn transversely through the center of the edge of the blade to which the handle is connected.

2. A pie slice lifter comprising a substantially triangular blade, a handle connected to one of the straight edges of the blade, the point of connection between the handle and blade being nearer to one corner of the blade than the adjacent corner, and said handle being upwardly offset with respect to the blade.

WILLIAM A. PETERSEN.